United States Patent

[11] 3,625,328

[72] Inventor Alvin J. Carli
 Sebring, Ohio
[21] Appl. No. 886,175
[22] Filed Dec. 18, 1969
[45] Patented Dec. 7, 1971
[73] Assignee The Alliance Manufacturing Company, Inc.

[54] DUAL-RESPONSE DRIVE TRAIN
 18 Claims, 5 Drawing Figs.
[52] U.S. Cl. .................................................. 192/142 R,
 49/28, 49/360, 192/150
[51] Int. Cl. ...................................................... F16d 71/00
[50] Field of Search ........................................... 192/142 R,
 150; 74/785; 49/28, 360

[56] References Cited
 UNITED STATES PATENTS

| | | | |
|---|---|---|---|
| 1,218,236 | 3/1917 | Backscheider | 192/150 |
| 2,086,030 | 7/1937 | Hodgson et al. | 74/785 |
| 2,791,920 | 5/1957 | Ray | 74/785 X |
| 2,826,658 | 3/1958 | Jackson | 49/28 X |
| 3,115,791 | 12/1963 | Dean | 74/785 X |
| 3,338,488 | 8/1967 | Hunt | 192/142 R X |

*Primary Examiner*—Allan D. Herrmann
*Attorney*—Woodling, Krost, Granger and Rust ABSTRACT: A planetary drive train is disclosed having a first input from an electric motor and a first output which is connected to drive a load. A second output from the drive train is partially rotatable and is connected to actuate a control switch whenever the torque requirements of the load exceed a first predetermined limit established by an adjustable screw and a yieldable spring. When this predetermined limit is exceeded the spring is stressed to permit partial rotation of the planetary drive second output and this actuates the switch to deenergize the motor. Additionally, the planetary drive first output driving the load is connected so that movement of the load between first and second limits actuates the switch to deenergize the motor. The load may be a garage door moved between upward and downward limit positions, and the drive train second output may be a limiting torque condition to deenergize the drive motor whenever the garage door exceeds first and second predetermined force requirements in moving in the upward and downward directions. The foregoing abstract is merely a resume of one general application, is not a complete discussion of all principles of operation or applications, and is not to be construed as a limitation on the scope of the claimed subject matter.

INVENTOR.
ALVIN J. CARLI

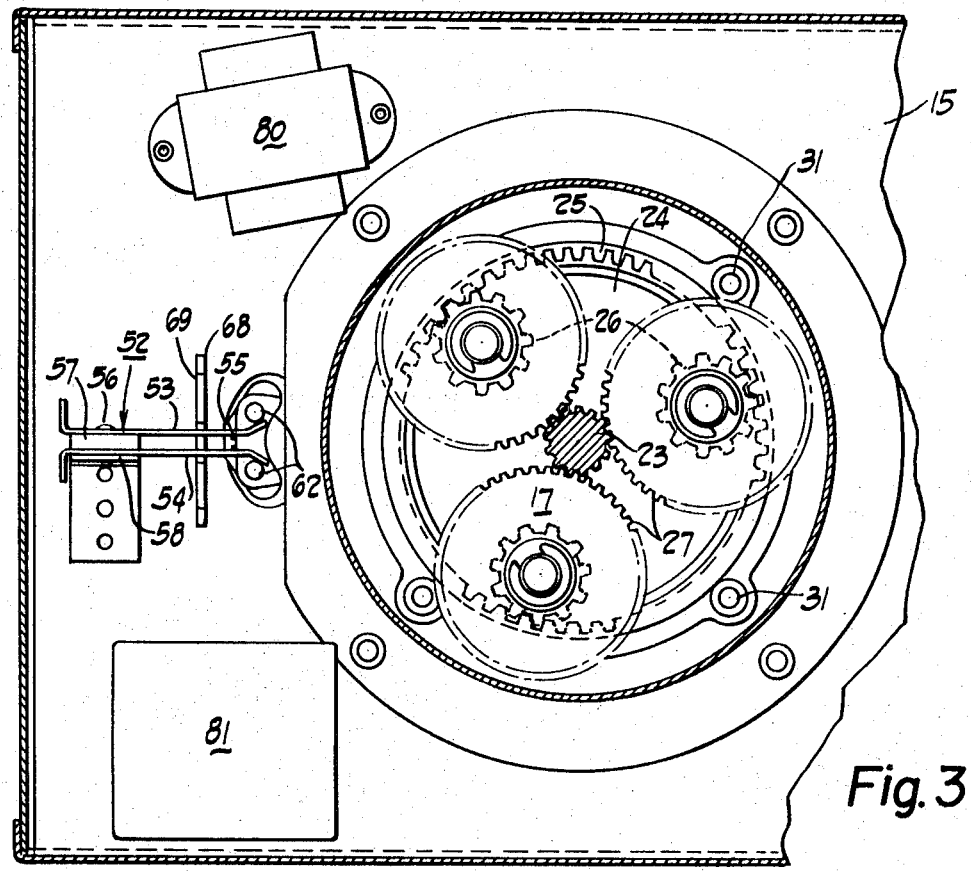
Fig. 3
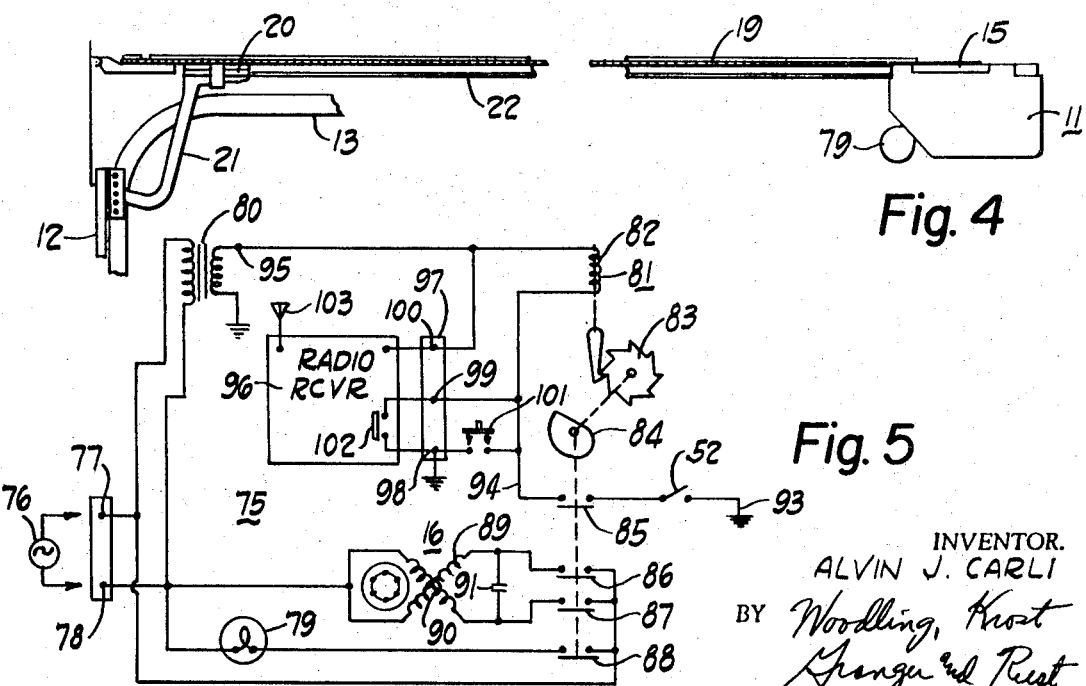
Fig. 4
Fig. 5

DUAL-RESPONSE DRIVE TRAIN

BACKGROUND OF THE INVENTION

The prior art has known different forms of planetary gear trains wherein the first output drives a load and a second output is partially rotatable against yieldable means so that when the prestress in the yieldable means is exceeded the second output partially rotates and actuates a switch. Also the prior art has known planetary gear drive trains for garage door operators. One difficulty with such prior art devices was the lack of flexibility and versatility in the control system. Also such prior art devices have required a plurality of control means or control switches in order to control the operation of a motor or load and this results in complexity and poor reliability of the associated electrical circuit.

SUMMARY OF THE INVENTION

The invention may be incorporated in a drive mechanism for a load, comprising in combination, a frame, an electric motor, a planetary drive train having an input connected to said motor and having a first output connectable to a load, a second output of said planetary drive train at least partially rotatable relative to said frame, means mounting said motor and drive train on said frame, yieldable means urging said second output of said planetary drive train to a position and establishing a first predetermined limit of load force for load movement, control means for the load, first means connecting said control means for actuation by movement of said first output of said planetary drive train, and second means connecting said control means for actuation by movement of said second output of said planetary drive train to actuate said control means upon load force requirements exceeding said first predetermined limit.

An object of the invention is to provide a planetary drive train which overcomes the above-mentioned disadvantages.

Another object of the invention is to provide a planetary drive train having first and second outputs with both outputs actuating a control switch.

Another object of the invention is to provide a planetary drive train wherein a first output is the main drive to a load and a second output is used for safety control purposes yet with both outputs controlling actuation of a control circuit.

Another object of the invention is to provide a planetary drive train wherein each of first and second outputs is bidirectional for bidirectional actuation of a single control switch.

Other objects and a fuller understanding of the invention may be had by referring to the following description and claims, taken in conjunction with the accompany drawings.

BRIEF DESCRIPTION OF THE DRAWINGS

FIG. 3 is a sectional view on the line 3-3 of FIG. 2;

FIG. 4 is a side elevational view of the drive mechanism of the invention incorporated into a garage door operator; and FIG. 5 is a schematic diagram of the electrical circuit for the drive mechanism.

PREFERRED EMBODIMENT OF THE INVENTION

Figure 1:
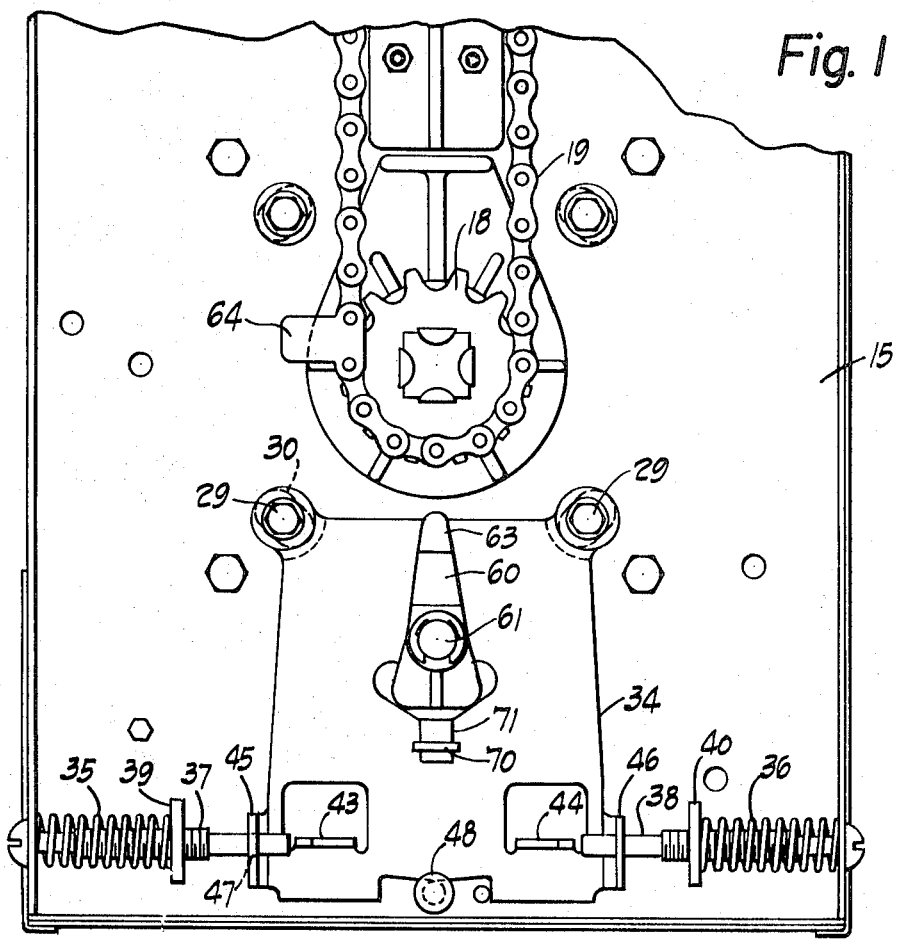
FIG. 1 is a plan view of a drive mechanism constructed according to the invention.

The figures of the drawing show the preferred embodiment of a drive mechanism 11 which may be used to drive a load 12 shown in FIG. 4 as a garage door. This is one example of a reversely movable load which may be moved and controlled in its movement by the drive mechanism 11. The door 12 may be a sectional upward acting door moving on a track 13. The drive mechanism 11 includes generally a frame 15, an electric motor 16, a planetary drive train 17, a drive sprocket 18, chain 19, carriage 20 connectable to the chain, and a door arm 21 connectable between the carriage 20 and the door 12. A frame extension 22 is fastened to the frame 15 and to the header of the garage door, providing a guide for the carriage 20.

The frame 15 may be a sheet metal base plate upon which many of the other components are mounted. The stator of the electric motor 16 is mounted directly on this frame 15. The planetary drive train 17 has an input from the motor 16 at a drive pinion 23 and has first and second outputs 24 and 25, respectively. This planetary drive train 17 includes a ring gear 25 as the second output and includes a spider 24 as the first output. The spider 24 is journaled on the frame 15 and carries three planet pinions 26 meshing with this internal ring gear 25. Integral with each of the planet pinions 26 is a planet gear 27 meshing with the input pinion 23. These integral planet pinions and gears give a double reduction in speed so that the first output spider 24 has about a 16 to 1 speed reduction. Coaxial with the spider 24 and fixed thereto is the drive sprocket 18 to drive the chain 19.

The ring gear 25, which is the second output from the planetary drive train 17, is mounted for partial rotational movement relative to the frame 15. This is accomplished by bolts 29 extending through enlarged apertures 30 in the frame 15 and threaded into apertures 31 in the ring gear 25.

A reaction plate or member 34 has apertures closely received on two of the bolts 29 so that this reaction plate acts like a radial arm extending from the ring gear 25 and has a partial rotational movement therewith. This reaction plate 34 is normally positioned in an intermediate or neutral position shown in FIGS. 1 and 2 by yieldable means including first and second springs 35 and 36. Each spring is a compression spring surrounding a first and a second adjusting bolt 37 and 38, respectively. First and second nuts 39 and 40 are threaded on the bolts 37 and 38, respectively. Each bolt extends through an aperture in a turned-down flange of the frame 15 so that the respective spring is prestressed between the frame and the respective nut. The nuts 39 and 40 are elongated and lie closely adjacent the base plate or frame 15 so as to prevent turning thereof. Ears 43 and 44 are bent from the reaction plate 34 for abutment by the end of the bolts 37 and 38, respectively. Also for the purpose of keeping these bolts in alignment with the ears, flanges 45 and 46 are bent from the reaction plate 34 and have apertures 47 through which bolts 37, 38 slidably pass. A headed rivet 48 keeps the reaction plate 34 closely adjacent the base plate or frame 15. The bolt 37 is an up-adjustment screw for upward movement of the door 12 and to adjust a first predetermined limit of torque on the ring gear 25 or force requirements exerted by the chain 19 on the door before the ring gear 25 will partially rotate. The second bolt 38 is a down-adjusting screw to adjust the stress or compression of the yieldable spring 36 and thus establish a second predetermined limit of torque on the ring gear 25 or force exerted by the chain 19 on the door 12 before this ring gear 25 will partially rotate. The main output from the planetary drive train 17 is on the spider 24, which is directly connected to and rotates the drive sprocket 18. However, the ring gear 25 is a second or secondary output which will be partially rotated when the load force or load torque requirements exceeds either the first or second predetermined limits as established by the prestress in the spring 35 or 36. The motor 16 is a bidirectional motor providing bidirectional drive of the load on door 12 and thus the reaction plate 34 may partially rotate in either direction whenever the respective predetermined limit is exceeded.

Figure 2:
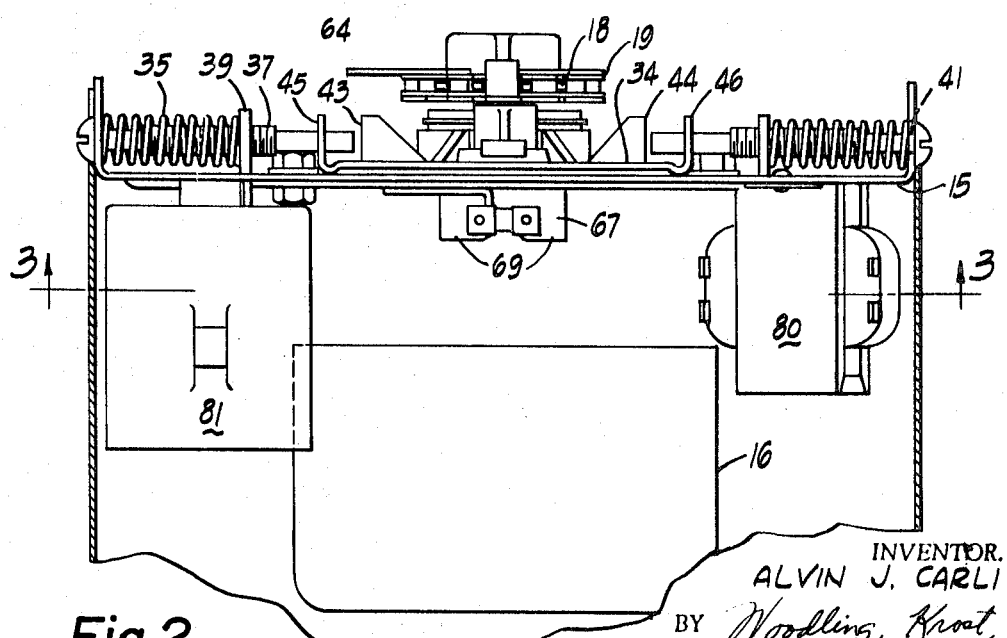
FIG. 2 is an elevational view of the drive mechanism of FIG. 1.

Control means 52 is controlled by both the first and second outputs 24 and 25 of the planetary drive train 17 and in this preferred embodiment the control means 52 is shown as an electrical switch. This switch 52 is mounted on the bottom of the base plate or frame 15 includes first and second contact blades 53 and 54 having cooperating contacts 55 near the ends thereof. Contact blade 53 is grounded to the frame by a rivet 56 and contact blade 54 is insulated from the frame 15 by insulator blocks 57 and 58. This switch 52 is normally open and is arranged to be closed by the pivotal movement of an insulator lever 60 pivoted at 61 on the reaction plate 34. The lever 60 has an insulator fork 62 straddling the two contact blades 53 and 54 so that pivoting of the lever 60 will close the switch contacts 55. The lever 60 has an extension 63 mounted in the path of movement of up and down limit cams 64, one of which is shown in FIGS. 1 and 2. These cams are fixed to the chain 19 and positioned on this chain so that when the door has reached the up limit position then the up limit cam will actuate the switch 52 and when the door has reached the down-limit position then the down-limit cam will actuate the switch 52.

An insulator plate 67 is slidably received in a slot 68 in the frame 15 and has a forked end 69 straddling the contact blades 53. This insulator plate 67 also has an extension 70 received through an aperture 71 in the reaction plate 34 so that partial rotational movement of this reaction plate 34 slides the insulator plate 67 lengthwise in the slot 68 and the forked end 69 thus actuates closed the control switch 52.

FIG. 5 shows schematically a diagram of the electrical circuit 75 for power and control of the drive mechanism 11. An AC source 76 such as a 115-volt source may be connected to input terminals 77 and 78 for operating power to the electric motor 16, an electric lamp 79 and to a stepdown transformer 80. The electrical circuit 75 includes a stepping or sequential relay 81 wherein a relay coil 82 when energized actuates a pawl and ratchet mechanism 83, indexing cam means 84 to the sequentially control four sets of contacts 85, 86, 87 and 88. When contacts 86 are closed and contacts 87 are open, then the motor 16 is energized for forward rotational direction for door-opening movement by direct energization of the stator winding 89 and leading current excitation of the stator winding 90 through a capacitor 91. Conversely when contacts 87 are closed and contacts 86 are open, then the motor 16 is energized for reverse rotation for door closing direction by direct energization of the stator winding 90 and leading current excitation of the stator winding 89 through capacitor 91. When contacts 88 are closed the lamp 79 is energized to illuminate the interior of the garage and when contacts 85 are closed, the control switch 52 is made operable to control the circuit. One side of the control switch 52 is connected to ground 93 and the other side of contacts 85 are connected by a conductor 94 through the relay coil 82 to a terminal 95 on the stepdown transformer 80. Low voltage such as 28 volts is available on this terminal 95. A radio receiver 96 is connected to terminals on a terminal strip 97. Terminal 98 is grounded. Terminal 99 is connected to the conductor 94 and terminal 100 is connected to the terminal 95. A normally open pushbutton switch 101 is connected between terminal 98 and conductor 94, and the radio receiver 96 has an internal switch 102 which may be actuated closed whenever an appropriate signal is received on the antenna 103 of the receiver 96.

The ratchet and pawl mechanism 83 actuates the cam means to control the contacts 85–88 and the relay index sequence is such that when the door is closed all contacts 85–88 are open. In the door-opening condition of the relay 81, the contacts 85, 86 and 88 are closed with contact 87 open. In the door open stationary position, contacts 88 are closed and contacts 85–87 are open. In the door-closing movement condition of the relay 81, contacts 85, 87 and 88 are closed with contacts 86 open. Also in the door-opening and door-closing conditions of the relay 81, the contacts 85 are open so long as the relay coil 82 is energized.

Operation

The drive mechanism 11 is used to control movement of the load 12 in two directions of movement as driven from the first output 24 of the planetary drive train 17. This drive train 17 provides speed reduction for movement of the chain 19 at an appropriate speed for opening and closing of the garage door load 12. Assuming that the garage door is closed, if the pushbutton 101 is momentarily closed, or if a received radio signal momentarily closes the switch 102, then the lower end of the relay coil 82 is grounded to energize this relay coil. This indexes the cam means 84 and closes the contacts 85, 86 and 88. Closing of contacts 86 energizes the motor for forward rotational direction which raises the door 12. Closing of the contacts 85 places the control switch 52 in the circuit which switch 52 will at that time be open. As the reaches the up-limit of travel, then one of the limit lugs 64 will actuate the lever 60, closing the control switch 52 which will momentarily energize the relay coil 82 and thus the relay will be indexed to the door open stationary condition. In such condition only the contacts 88 are closed for illumination of the lamp 79 and the remaining contacts 85–87 are open. This opening of contact 86 deenergized the motor 16 and thus it will be seen that motion of the limit lug or cam 64 has actuated the control switch 52, meaning that a condition of the first output 24 of the planetary drive train 17 has actuated the control switch 52.

To close the door 12, the switch 101 or 102 may be closed momentarily to energize the relay coil 82 and index the cam means 84 to the next position which will be the door-closing position. In such condition of the relay the contacts 85, 87 and 88 are closed, and the closing of contacts 87 energized the motor 16 for reverse rotation to drive the door 12 in a closing direction. Again when the door reaches the down-limit position the down-limit cam or lug 64 will actuate the lever 60 to momentarily close the control switch 52, which will again momentarily energize relay coil 82 and index the cam means 84 so that in this condition all contacts 85–88 are open. This deenergizes the motor 16 and controls the load 12 to stop this load.

Now if at any time the force required to move the garage door 12 in either the upward or downward direction exceeds the first and second predetermined limits of force established by the prestress on springs 35 or 36, then this increased force will result in an increased stress on one run of the chain 19 and result in an increased torque requirement on the drive sprocket 18. When this torque requirement exceeds the predetermined limit, then the ring gear 25 will partially rotate. This is a partial rotation of the second output of the planetary drive train 17 and this means that the reaction plate 34 will also partially rotate, and acting through the insulator plate 67 will actuate closed the control switch 52. The closing of this switch 52 will control the load 12 by stopping it via a stopping of the electric motor 16. Accordingly it will be seen that the single switch 52 is actuated for bidirectional movements of the first output 24 of the drive train 17 and is also actuated by bidirectional overload torque requirements which cause partial rotational movement of the second output 25 of this drive train 17. Further it will be noted that the stress on the springs 35 and 36 may be independently adjusted, for example, from 5 pounds up to 100 pounds of force on the door 12. This has the definite advantage of being able to compensate for weak or improperly adjusted counterbalancing springs on the door 12. For example, it might take 90 pounds of force to lift the door 12 and thus the up-adjusting screw 37 could be adjusted to provide a limit condition of 95 pounds of force before the reaction plate 34 moves clockwise as viewed in FIG. 1. This will provide a safety condition so that if the door meets some obstruction on its upward travel, the reaction plate 34 will be partially rotated and the door will be stopped. Also, if it takes only 50 pounds of force to close the door garage 12, then the down adjusting screw 38 might be adjusted for a predetermined stress on this spring 36 equivalent to 55 pounds of force on the door 12.

Thus, if the door should encounter some obstruction on its downward movement, the reaction plate 34 would move counterclockwise as shown in FIG. 1 to actuate the switch 52 and deenergize the motor 16. This separate adjustment of force for up and down travel is a safety feature, because if only a single adjustment were provided for both up and down, then in the above example it would have to be set at 95 pounds of force in order to lift the door 12. In the drive mechanism 11 one of the sun, ring and planet gears is the first output 24 and one is the second output 25. In this preferred embodiment the sun gear 23 is the input, the planet gears are the first output 24 and the ring gear is that which is the second output 25. An inspection of FIGS. 1 and 2 will show that the adjusting screw 37, for example, acts between the frame 15 and the drive train second output 25 via the ear 43 on the reaction plate 34. Also the compression spring 35 surrounds the bolt 37 and acts between the frame 15 and the nut 39. This provides an easy and simple adjustment of the first and second predetermined limits of force or torque requirements. Rotation of the bolt 37 does not move it lengthwise, it only moves the nut 39 lengthwise to adjust the prestress on the spring 35. This means that the head of the bolt 37 does not protrude materially beyond the flange of the frame 15 and hence is not unsightly nor will things become caught on it.

The present disclosure includes that contained in the appended claims, as well as that of the foregoing description. Although this invention has been described in its preferred form with a certain degree of particularity, it is understood that the present disclosure of the preferred form has been made only way of example and that numerous changes in the details of construction and the combination and arrangement of parts may be resorted to without departing from the spirit and the scope of the invention as hereinafter claimed.

What is claimed is:

1. A drive mechanism for a load, comprising in combination, a frame, an electric motor, a planetary drive train having an input connected to said motor and having a first output connectable to a load, a second output of said planetary drive train at least partially rotatable relative to said frame, means mounting said motor and drive train on said frame, yieldable means urging said second output of said planetary device train to a position and establishing a first predetermined limit of load force for load movement, control means for the load, first means connecting said control means for actuation by movement of said first output of said planetary drive train, second means connecting said control means for actuation by movement of said second output of said planetary drive train to actuate said control means upon load force requirements exceeding said first predetermined limit, and said control means including a single switch actuated by both the first and second outputs of said drive train.

2. A drive mechanism as set forth in claim 1, wherein said control means includes a single switch actuated by bidirectional movements of said drive train first output and by movements of said drive train second output.

3. A drive mechanism as set forth in claim 1, wherein said control means includes a single switch actuated by bidirectional movements of said drive train second output and by movements of said drive train first output.

4. A drive mechanism as set forth in claim 1, wherein said control means includes a single switch actuated by bidirectional movements of each said first and second outputs of said drive train.

5. A drive mechanism as set forth in claim 1, wherein said load is a garage door.

6. A drive mechanism as set forth in claim 1, wherein said yieldable means includes spring means, and adjustable means to adjust the stress in said spring means.

7. A drive mechanism as set forth in claim 1, wherein said yieldable means includes said first and second spring means, first and second adjustment means adjusting the stress in said first and second spring means to urge said drive train second output into an intermediate position.

8. A drive mechanism as set forth in claim 1, including said first output means being responsive to movement of the load to actuate said switch, and said second output means being responsive to an increase in movement of said second output relative to said first output to actuate said switch.

9. A drive mechanism as set forth in claim 1, including means mounting said switch on said frame,
a flexible chain as part of said drive train first output,
a pivoted lever arranged to actuate said switch closed by movement of said pivoted lever,
a lug on said chain arranged to coact with said pivoted lever to actuate same to close said switch,
a reaction plate as part of said drive train second input,
and an insulator actuator carried by said reaction plate and arranged to actuate said switch upon movement of said insulator actuator.

10. A drive mechanism as set forth in claim 9, including means to pivot said lever on said reaction plate.

11. A drive mechanism as set forth in claim 1, wherein said yieldable means includes a compression spring and an adjustable screw,
and means establishing said adjustable screw acting between said frame and said drive train second output.

12. A drive mechanism as set forth in claim 1, wherein said yieldable means includes a spring,
an adjustment bolt,
a nut threaded on said bolt,
and said spring acting between said nut and said frame.

13. A drive mechanism as set forth in claim 12, wherein said spring is a compression spring surrounding said adjustment bolt,
and said bolt acts between said frame and said drive train second output.

14. A drive mechanism as set forth in claim 12, wherein said adjustment bolt is rotatable for adjustment of the stress on said spring without axial movement of said bolt relative to said frame or relative to said drive train second output.

15. A drive mechanism as set forth in claim 1, wherein said planetary drive train includes a sun gear, a ring gear and planet gear,
one of said gears being said second output,
and a reaction plate carrying said secondary output of said planetary gear train.

16. A drive mechanism as set forth in claim 15, wherein said sun gear is the input of said planetary gear train,
said planet gears are the first output of said gear train,
and said ring gear is the second output of said planetary gear train which is carried on said reaction plate.

17. A drive mechanism as set forth in claim 16, including a spider journaled on said frame,
and means journaling said planet gears on said spider for cooperation with said sun and ring gears.

18. A drive mechanism for a reversible load, comprising in combination,
a frame,
an electric motor,
a planetary drive train having an input connected to said motor and having a reversible first output connectable to move a load in a first and a second direction,
a second output of said planetary drive train at least partially rotatable relative to said frame,
means mounting said motor and drive train on said frame,
first and second yieldable means urging said second output of said planetary drive train to an intermediate position and establishing first and second predetermined limits of load force for load movement respectively,
control means for the load,
first means connecting said control means for actuation by movement of said first output of said planetary drive train,
and second means connecting said control means for actuation by first and second directions of movement of said second output of said planetary drive train to actuate said control means upon load force requirements exceeding said first and second predetermined limits, respectively.

* * * * *